United States Patent [19]

Ohno et al.

[11] 4,437,747

[45] Mar. 20, 1984

[54] DEVICE FOR MOUNTING AN ELECTRONIC FLASH UNIT

[75] Inventors: Masato Ohno, Chiba; Keiji Ohsawa, Yokohama, both of Japan

[73] Assignee: Nippon Kogaku K.K., Tokyo, Japan

[21] Appl. No.: 369,005

[22] Filed: Apr. 16, 1982

[30] Foreign Application Priority Data

Apr. 21, 1981 [JP] Japan .............................. 56-57655[U]

[51] Int. Cl.³ .............................................. G03B 15/05
[52] U.S. Cl. .................................. 354/126; 354/145.1
[58] Field of Search ............... 354/126, 129, 145, 214; 362/3

[56] References Cited

U.S. PATENT DOCUMENTS

| 3,286,612 | 11/1966 | Lieser | 354/129 |
| 3,338,146 | 8/1967 | Schmidt | 354/145 |
| 3,768,387 | 10/1973 | Hasegawa | 354/126 |
| 3,883,884 | 5/1975 | Fuchsel | 354/129 |

Primary Examiner—A. A. Mathews
Attorney, Agent, or Firm—Shapiro and Shapiro

[57] ABSTRACT

An electronic flash mounting device enables operation of the rewinding knob while the flash unit is kept in the mounted position on a camera body having an accessory shoe around the knob and a flash synchronizing signal transmission terminal.

8 Claims, 5 Drawing Figures

DEVICE FOR MOUNTING AN ELECTRONIC FLASH UNIT

BACKGROUND OF THE INVENTION

1. Field of the Invention

The present invention relates to a device for mounting an electronic flash unit on a camera.

2. Description of the Prior Art

In the art there is known such type of camera which is provided with an accessory shoe around a film rewinding operation knob and also with a terminal disposed in the vicinity of the shoe for transmitting an electronic flash synchronizing signal. In this type of camera, the synchronizing signal transmitting terminal on the camera is connected to a corresponding terminal on the electronic flash unit when the flash unit is directly mounted on and fixed to the accessory shoe of the camera. Therefore, after mounting the flash unit, a signal can be transmitted to the electronic flash unit from the camera through the terminals to make the flash unit flash in synchronism with a shutter releasing operation. However, this type of camera has a drawback in view of the knob operation. When the flash unit is mounted on the camera, the space directly above the film rewinding knob is occupied by the electronic flash unit and therefore it is no longer possible to operate the rewinding knob while keeping the flash unit in the mounted position on the camera.

SUMMARY OF THE INVENTION

Accordingly it is an object of the invention to provide an electronic flash mounting device which enables operation of rewinding knob while the flash unit is kept in the mounted position on a camera body having an accessory shoe around the knob and a flash synchronizing signal transmission terminal.

Other and further objects, features and advantages of the invention will appear more fully from the following description of preferred embodiments taken in connection with the accompanying drawings.

DETAILED DESCRIPTION OF PREFERRED EMBODIMENTS

Figure 1:
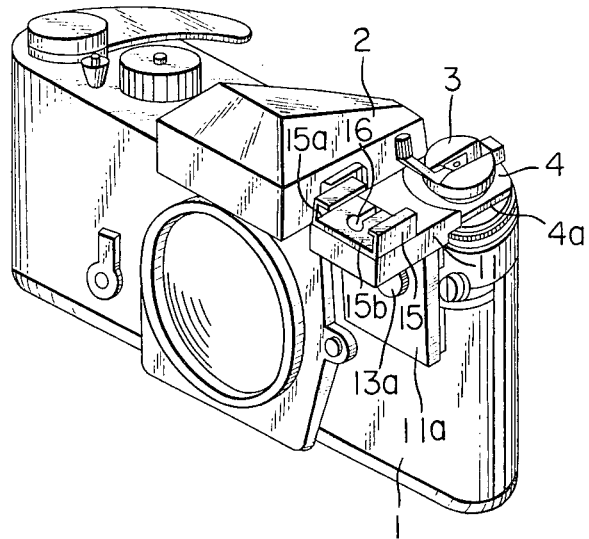
FIG. 1 is a perspective view of a camera body with a mounting device mounted thereon showing an embodiment of the invention.

First, the structure of the camera body shown in FIGS. 1 and 2 will be described in detail.

Generally designated by 1 is a camera body. 2 is a finder cover removably mounted on the camera body 1. The finder cover 2 contains therein an optical finder. 3 is a rewind operation knob at the top of the camera for rewinding film into a film magazine or cartridge. 4 is an accessory shoe around the knob 3. The accessory shoe 4 is so formed as to enclose the knob and is fixed to the camera body 1. At the sides of the knob 3 the accessory shoe 4 has two slide slot 4a extending in the direction of the optical axis. As will be described later, shoe members 12a and 12b are inserted into the slide slots 4a. 5 is an output terminal for transmitting an electronic flash synchronizing signal. The output terminal 5 is fixed to the camera body 1 at the portion in the vicinity of the accessory shoe 4. The accessory shoe 4 and the output terminal 5 are connected to two terminals of a synchro signal transmission switch (not shown), respectively. 6 is a synchro socket at the front of the camera having a screw part 6a. Although not shown in the drawing, the leading end of a synchro cord may be connected to the synchro socket at the screw part 6a.

Figure 3:
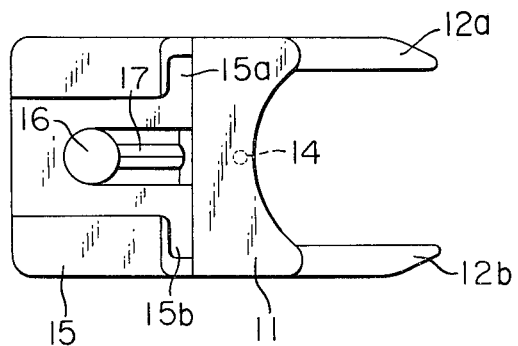
FIG. 3 is a plan view of the embodiment of the mounting device.

FIG. 3 shows the detailed structure of the electronic flash mounting device according to the first embodiment of the invention.

The main body of the mounting device is designated generally by 11. The main body 11 has a pair of shoe members 12a and 12b in the form of a fork. The shoe members 12a and 12b are inserted into the above mentioned two slide slots 4a provided at the sides of the accessory shoe, respectively. As seen in FIGS. 1 and 2, the main body 11 has a depending angle part 11a. In the angle part 11a there is formed a through-hole 11b which receives a screw member 13. The screw member 13 is composed of operation head part 13a, shank part 13b and thread part 13c. The inner diameter of the hole 11b is larger than the outer diameter of the shank part 13b and smaller than the outer diameters of the operation part 13a and thread part 13c. 14 is a signal transmission terminal in contact with the synchro signal transmission terminal 5 on the camera. The terminal 14 is fixed to the main body of the mounting device 11. 15 is an accessory shoe formed at the forward projection end of the main body 11. The accessory shoe 15 has two slide slots 15a and 15b. 16 is a flash synchro signal transmission terminal formed at the middle of the accessory shoe 15. The terminal 16 is connected to the terminal 14 through an electroconductive member $L_1$ within the mounting device 11. Through another electroconductive member $L_2$ the paired shoe members 12a and 12b are connected to the accessory shoe 15. 17 is a slide slot along which an electronic flash unit (not shown) is inserted into the accessory shoe 15. The accessory shoe 15 and its terminal 16 per se have a known structure.

The manner of mounting the mounting device 11 onto the accessory shoe 4 of the camera is as follows:

First the user inserts the pair of shoe members 12a and 12b of the device 11 into the slide slots 4a on the both sides of the accessory shoe 4, respectively, from the front side of the camera. When the shoe members 12a and 12b are completely inserted into the slots 4a of the accessory shoe 4, the terminal 14 on the mounting device is placed in contact with the terminal 5 on the camera. Therefore, in this position, a flash synchro signal can be transmitted to the mounting device 11 from the camera. As will be understood from the above, the two terminals 14 and 5 are positioned in such manner that they come into contact with each other when the shoe members 12a and 12b are inserted into the slide slots 4a formed on the accessory shoe 4.

When the insertion of the shoe members 12a and 12b is completed, the screw member 13 received in the hole 11b of the angled portion 11a is in the position opposed to the synchro socket 6 fixed to the camera. In this position, the user turns the operation head part 13a of the screw member so as to screw the thread part 13c into the screw part 6a of the synchro socket 6. By this operation, the angled portion 11a of the mounting device is urged toward the front side wall surface of the camera body. Therefore, the shoe members 12a and 12b are pushed against the front wall surface 4b of the accessory shoe 4 by the operation part 13a. In this manner, by turning the screw member 13, the shoe members 12a and 12b are pressed against the accessory shoe 4 and the mounting device 11 is fixed on the accessory shoe 4. At this time, as shown in FIG. 2, the terminal 14 on the mounting device is held in the position contacted with the terminals on the camera body 1.

The mounting device 11 can be removed from the camera body 1 in a simple manner by operating the head part 13a of the screw member 13 in the direction for releasing the thread engagement between the screw part 6a and the thread part 13c.

To mount an electronic flash unit (not shown) on the accessory shoe 15, the user inserts the accessory shoe member (not shown) of the flash unit into the accessory shoe 15 from the back side of the camera body 1. Through fixing means (not shown) provided on the flash unit, the latter is fixed on the accessory shoe 15. When the electronic flash unit is fixed to the accessory shoe 15, the terminal on the flash unit and the terminal 16 on the accessory shoe 15 are placed in contact with each other so that an electro flash synchronizing signal can be transmitted to the flash unit from the camera body 1 through the mounting device 11. Therefore, when the operator pushes down the shutter button on the camera body 1, a synchro signal is transmitted to the electronic flash unit in response to the shutter opening and the latter starts flashing in synchronism with the releasing of the shutter.

In the mounting device of the invention, the electronic flash unit is supported by the accessory shoe 15 spaced from the film rewinding knob 3 on the camera body 1. Therefore, the space above the knob 3 is never occupied by the electronic flash unit. As the electronic flash unit on the mounting device 11 can not interfere with the operation of the knob 3, the user can rewind the film while leaving the flash unit mounted on the camera.

Figure 4:
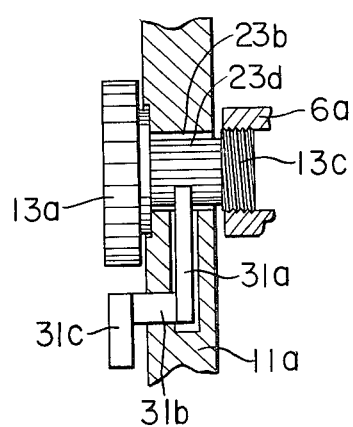
FIG. 4 is a partially sectional view of a second embodiment of the invention.
Figure 5:
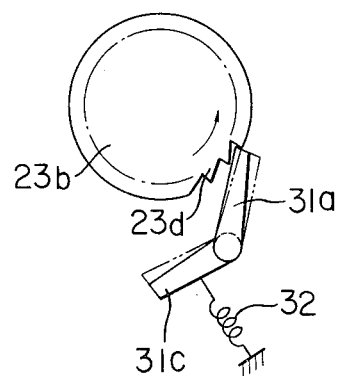
FIG. 5 is a partial front view of the second embodiment.

FIGS. 4 and 5 show another embodiment of the invention.

Figure 2:
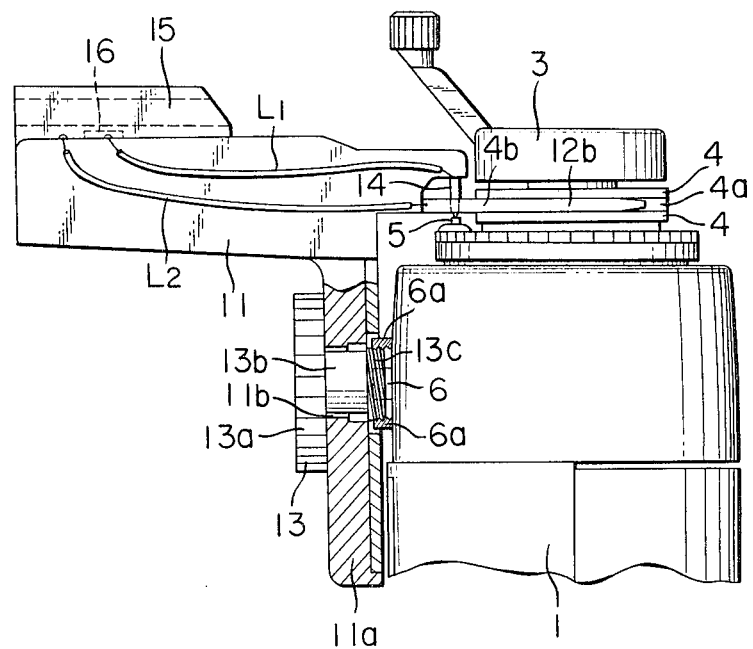
FIG. 2 is a side view thereof.

The second embodiment shown in FIGS. 4 and 5 is different from the first one shown in FIGS. 1 to 3 only in the structure of the screw member 13, more particularly, in the structure of its shank part.

The shank part 13b of the screw member 13 in the first embodiment has a simple circular cross section. In contrast, the shank part 23b in the second embodiment has ratchet teeth 23d formed on the circumference. Furthermore, a ratchet pawl 31a is provided in the angled portion 11a of the mounting device. The ratchet pawl 31a is so supported by the angled portion 11a as to be rotatable about a shaft part 31b. An operation lever part 31c projects outward from the angled portion 11a of the mounting device. The ratchet pawl 31a is biased by a spring 32 urging the tip end of the ratchet pawl 31a into engagement with the ratchet tooth 23d. The outer diameter of the ratchet 23d is smaller than the inner diameter of the hole 11b. The outer diameters of the operation head part 13a and thread part 13c are larger than the inner diameter of the hole 11b. Other parts of the structure of the second embodiment correspond to those of the first embodiment and need not be further described.

The mounting device according to the second embodiment of the invention is mounted on the camera body 1 in the following manner:

Like the first embodiment, the mounting device 11 of the second embodiment is fixed to the camera body 1 by turning the operation head part 13a and therefore the shank part 23b counterclockwise as viewed on the drawing of FIG. 5. The spring biased ratchet pawl 31a is always in engagement with the ratchet teeth 23d so as to prevent the shank part 23b from rotating clockwise as viewed in the drawing of FIG. 5. Therefore, after the mounting device 11 has once been fixed to the camera body 1 through the thread engagement between screw portions 13c and 6a, the screw member 13 is inhibited from rotating in the direction for loosening the thread engagement. Thus, the screw never becomes loose and the mounting device 11 can be held in the fixed position without fail. To remove the mounting device 11 from the camera body 1, the user rotates the ratchet pawl 31a clockwise by operating the operation lever portion 31c. After the ratchet pawl 31a is disengaged from the ratchet teeth 23d to allow the shank part 23b to be rotated clockwise, the user turns the operation head part 13a to release the thread engagement between the screw portions 13c and 6a. Other parts of the operation of the second embodiment correspond to those of the first embodiment shown in FIGS. 1 to 3.

We claim:

1. A device for mounting an electronic flash unit on a camera of the type having film-rewind operating means, accessory supporting means adjacent to said operating means, and a terminal for transmitting a signal to the flash unit, said device comprising a body having first means disposed to engage said accessory supporting means so as to support the body thereon and having second means for fixing the body to said camera, said body also having means for supporting said flash unit thereon at a position away from said film-rewind operating means and having means for electrically connecting said flash unit to said terminal when the flash unit is supported on said body.

2. A device according to claim 1, wherein said camera has a threaded portion, and wherein said second means comprises means for engaging said threaded portion.

3. A device according to claim 2, wherein said body has a depending part and wherein said second means comprises a screw on said depending part adapted to be threaded into said threaded portion.

4. A device according to claim 3, wherein said screw is provided with releasable means for preventing the screw from rotating in a direction to unthread the screw from the threaded portion.

5. A device according to claim 1, wherein said accessory supporting means comprises an accessory shoe disposed around the film-rewind operating means and wherein said first means comprises a fork engageable with said shoe at opposite sides of the film-rewind operating means.

6. A device according to claim 5, wherein the camera has a threaded synchro socket and said second means comprises a screw adapted to be threadedly engaged with the synchro socket.

7. A device according to claim 6, wherein said film-rewind operating means is located at the top of the camera, said synchro socket is located at the front of the camera, and said body has a depending part adapted to be positioned at the front of the camera with said screw aligned with said synchro socket.

8. A device for mounting an electronic flash unit on a camera of the type having a flash signal terminal and having a threaded synchro socket, said device comprising a body having a screw adapted to be threaded into the synchro socket to fix the body to the camera and having means for supporting said flash unit thereon, and said body also having means for electrically connecting the flash unit supported thereon to said flash signal terminal.

* * * * *